US009643366B2

(12) United States Patent
Kast et al.

(10) Patent No.: US 9,643,366 B2
(45) Date of Patent: May 9, 2017

(54) METHOD AND DEVICE FOR PRODUCING A LENS WAFER

(75) Inventors: Michael Kast, Wels (AT); Markus Wimplinger, Ried im Innkreis (AT)

(73) Assignee: EV Group GmbH, St. Florian am Inn (AT)

( * ) Notice: Subject to any disclaimer, the term of this patent is extended or adjusted under 35 U.S.C. 154(b) by 311 days.

(21) Appl. No.: 13/825,826

(22) PCT Filed: Oct. 26, 2010

(86) PCT No.: PCT/EP2010/006518
§ 371 (c)(1),
(2), (4) Date: Mar. 25, 2013

(87) PCT Pub. No.: WO2012/055424
PCT Pub. Date: May 3, 2012

(65) Prior Publication Data
US 2013/0193596 A1    Aug. 1, 2013

(51) Int. Cl.
| | | |
|---|---|---|
| B29D 11/00 | (2006.01) | |
| B29C 43/02 | (2006.01) | |
| G02B 3/00 | (2006.01) | |
| B29L 11/00 | (2006.01) | |
| B29C 33/20 | (2006.01) | |
| B29C 43/58 | (2006.01) | |

(52) U.S. Cl.
CPC ........ B29D 11/00365 (2013.01); B29C 33/20 (2013.01); B29C 43/021 (2013.01); B29C 43/58 (2013.01); B29D 11/005 (2013.01); B29D 11/00278 (2013.01); B29D 11/00951 (2013.01); *B29C 2043/5833* (2013.01)

(58) Field of Classification Search
CPC ............ B29D 11/00365; B29D 11/005; B29D 11/00951; B29C 33/20; B29C 43/021; G02B 3/00; B29L 2011/00
USPC .................................................. 264/1.32, 1.1
See application file for complete search history.

(56) References Cited

U.S. PATENT DOCUMENTS

| | | | |
|---|---|---|---|
| 4,076,780 A | 2/1978 | Ditto | 264/40.5 |
| 5,324,623 A | 6/1994 | Tsumori | 430/321 |
| 5,853,960 A | 12/1998 | Tran et al. | 430/321 |
| 5,871,888 A | 2/1999 | Heremans et al. | 430/321 |
| 6,187,243 B1 | 2/2001 | Miyajima | 264/272.15 |
| 6,363,603 B1 | 4/2002 | Nemoto et al. | 29/458 |
| 6,846,137 B1 | 1/2005 | Border et al. | 409/163 |
| 8,540,906 B2 | 9/2013 | Yoshida | 264/1.32 |
| 9,194,700 B2 | 11/2015 | Kast et al. | G01B 21/24 |

(Continued)

FOREIGN PATENT DOCUMENTS

| | | | |
|---|---|---|---|
| EP | 1201409 | 5/2002 | B29D 11/00 |
| EP | 2168746 | 3/2010 | B29C 43/02 |

(Continued)

OTHER PUBLICATIONS

Int'l Search Report from corresponding PCT/EP2012/006518 (Form PCT/ISA/210); 2 pages (English version only).

(Continued)

*Primary Examiner* — Alison L Hindenlang
*Assistant Examiner* — Jerzi H Moreno Hernandez
(74) *Attorney, Agent, or Firm* — Kusner & Jaffe

(57) ABSTRACT

A method and a device for producing a lens wafer which has a plurality of microlenses, as well as microlenses produced from the lens wafer.

15 Claims, 4 Drawing Sheets

(56) References Cited

U.S. PATENT DOCUMENTS

| | | | |
|---|---|---|---|
| 2004/0090571 A1 | 5/2004 | Fujita | 349/95 |
| 2005/0088751 A1 | 4/2005 | Shimizu et al. | 359/619 |
| 2006/0157444 A1 | 7/2006 | Nakamura et al. | 216/54 |
| 2006/0231979 A1 | 10/2006 | Santen et al. | 264/319 |
| 2007/0141191 A1* | 6/2007 | Kruijt-Stegeman | B29C 59/022 425/174.4 |
| 2007/0158866 A1* | 7/2007 | Wu | B82Y 10/00 264/1.33 |
| 2007/0228610 A1 | 10/2007 | Sreenivasan et al. | 264/319 |
| 2008/0073604 A1* | 3/2008 | Suehira et al. | 250/559.3 |
| 2008/0217813 A1* | 9/2008 | Chou | B29C 33/62 264/293 |
| 2009/0161106 A1* | 6/2009 | Shin et al. | 356/399 |
| 2009/0220629 A1 | 9/2009 | Narasimalu et al. | 425/149 |
| 2010/0025868 A1 | 2/2010 | Louh | 264/1.1 |
| 2010/0123260 A1* | 5/2010 | Duparre et al. | 264/1.38 |
| 2010/0157428 A1 | 6/2010 | Wu et al. | 359/622 |
| 2010/0208354 A1 | 8/2010 | Okazaki et al. | 359/622 |
| 2010/0270692 A1 | 10/2010 | Yu | 264/1.38 |
| 2010/0270705 A1* | 10/2010 | Okushima | B82Y 10/00 264/293 |
| 2010/0289190 A1 | 11/2010 | Kawakami et al. | 264/496 |
| 2011/0278750 A1 | 11/2011 | Fujii et al. | 264/1.36 |
| 2012/0068370 A1 | 3/2012 | Saruya et al. | 264/1.36 |
| 2012/0299208 A1 | 11/2012 | Hansen | 264/40.1 |
| 2013/0147070 A1* | 6/2013 | Kast et al. | 264/1.1 |

FOREIGN PATENT DOCUMENTS

| | | | | |
|---|---|---|---|---|
| JP | H08238636 A | | 9/1996 | B29C 33/04 |
| JP | 2002014205 A | | 1/2002 | B29D 11/00 |
| JP | 2004163695 A | | 6/2004 | B29C 43/02 |
| JP | 2008-152038 | | 7/2008 | B29C 39/10 |
| JP | 2008244441 A | * | 10/2008 | |
| JP | 2010-173196 A | | 8/2010 | B29C 43/02 |
| WO | WO2009133756 A1 | | 11/2009 | G02B 3/00 |
| WO | WO 2010/087077 | | 8/2010 | B29D 11/00 |
| WO | WO 2010/087083 | | 8/2010 | B29C 39/10 |
| WO | WO 2010087077 | * | 8/2010 | |
| WO | WO 2010/137368 | | 12/2010 | B29C 39/10 |
| WO | WO 2012/028163 | | 3/2012 | G02B 3/00 |
| WO | WO 2012/028166 | | 3/2012 | G01B 21/24 |

OTHER PUBLICATIONS

Office Action from corresponding Chinese Patent Application No. 201080068891.4, Jun. 30, 2014 (with English translation).

Int'l Search Report from corresponding PCT/EP2010/005374, dated Jun. 6, 2011.

Office Action issued in connection with related U.S. Appl. No. 13/818,129 dated Jul. 27, 2016.

Office Action issued in related U.S. Appl. No. 14/748,716 dated Sep. 28, 2016.

Google Translate—English Language, translate.google.com, of Saito, et al,, International Publication No. WO2010087077, [0057]-[0082]. Published on Aug. 5, 2010 and translated on Dec. 7, 2016.

Office Action issued in corresponding U.S. Appl. No. 13/818,129 dated Nov. 30, 2016.

* cited by examiner

METHOD AND DEVICE FOR PRODUCING A LENS WAFER

FIELD OF THE INVENTION

This invention relates to a method and a device for producing a lens wafer which has a plurality of microlenses. Furthermore, the present invention relates to a lens wafer and microlenses which have been produced from the lens wafer.

BACKGROUND OF THE INVENTION

Microlenses are used primarily for devices which require an optical focusing means, such as for example cameras of cell phones. As a result of miniaturization, functional regions will become smaller and smaller. The more the microlenses are to be miniaturized, the more difficult their optically correct production becomes, because at the same time the cost pressure for the microlenses which are ideally to be produced in mass production is enormous. In the prior art microlenses are produced on a carrier substrate by different production methods, such as for example as shown in U.S. Pat. No. 6,846,137 B1, U.S. Pat. No. 5,324,623, U.S. Pat. No. 5,853,960, and U.S. Pat. No. 5,871,888. It is common to all the aforementioned methods that a certain thickness is necessary, and the light which passes through the microlens must pass not only through the lens, but the carrier substrate. As a result of the simultaneously required high quality and demands for higher resolution with simultaneously higher brilliance which depends among others on the thickness and the number of optics along the optical axis, therefore along the beam path, further optimization of the microlenses according to the prior art is desirable.

US2010/0208354 B1 shows a method for production of a microlens array.

The greatest problem for these microlenses with carriers is the correct alignment of the stamping die relative to the carrier. Faults in the alignment are often exacerbated by the microlenses which have been produced with carriers generally being stacked.

The elimination of a wedge fault of the die relative to the carrier is especially important for a correct optical axis of the microlenses, since the optical axis cannot be stamped exactly perpendicular to the carrier in the presence of a wedge fault during stamping.

SUMMARY OF THE INVENTION

An advantage of this invention is a device and a method for mass production of microlenses with carriers which have high production accuracy, especially an exactly aligned optical axis.

This and other advantages is achieved according to the invention defined in the claims. All combinations of at least two of the features given in the specification, the claims and/or the figures also fall within the framework of the invention. At the given value ranges, values which lie within the indicated limits will also be considered disclosed as boundary values and will be claimed in any combination.

The invention is based on the idea of aligning the carrier, especially the wafer, during stamping, especially during shaping of the curable fluid relative to the stamping die. In this way in-situ alignment is enabled. This furthermore has the positive consequence that the distance D between the die and the carrier, especially towards the end of shaping of the microlens field, is as small as possible. In this way the alignment can be done much more precisely than in the prior art.

The following method steps are provided as claimed in the invention, especially in the sequence cited below:

application of the lens material, especially of a curable fluid, preferably a polymer, in fluid form to one stamping side of the wafer and/or to one stamping side of a die, which side has lens molds for stamping of the microlenses, movement of the die which is located essentially parallel, specifically in an X-Y plane, and oppositely to the wafer, together, in a Z-direction which runs perpendicular to the X-Y plane, stamping of the lens wafer by shaping and subsequent curing of the lens material, the shaping taking place by moving the dies together.

According to the present invention, wedge faults are equalized by wedge fault equalization means for parallel alignment of the stamping sides and/or an X-Y alignment of the die with the wafer during shaping. The term "X-Y alignment" means an alignment in the X-Y plane, and therefore includes rotation in the X-Y plane.

The wedge fault equalization is especially important for the quality of the microlenses produced by the method as claimed in the invention since wedge fault equalization according to this invention enables a much more exact and reproducible, exactly vertical alignment of the optical axis of the microlenses.

According to one embodiment of the invention, the wedge fault equalization or the X-Y alignment takes place continuously after a certain value of a distance D of the stamping side of the wafer and the stamping side of the die is no longer reached. This is because it is especially advantageous to carry out alignment briefly before the stamping or curing of the lens wafer, since at this instant, the distance D between the stamping sides is the minimum possible so that especially with a position detection means which is rigid to the stamping sides extremely accurate detection of the position of the stamping sides and thus the position of the wafer and the die is enabled. Detecting the position of the wafer and of the die or of the respective stamping sides to one another enables exact control of the wedge fault equalization means and of the X-Y alignment by X-Y alignment means.

Accordingly, it is especially advantageous when shaping according to one embodiment of the invention takes place position-controlled.

For wedge fault equalization and/or for X-Y alignment, corresponding alignment marks are provided in the die, especially on its stamping side, preferably at least on one peripheral edge of the die, and in the wafer, especially on its stamping side, preferably at least on one peripheral edge of the wafer, there are corresponding alignment marks. Still more exact detection of the position of the stamping sides can be accomplished when the distance between the position marks is as small as possible, and integrated into the stamping sides, especially flush, by the arrangement of the position marks on the stamping sides. In this way, the accuracy of the position detection is distinctly increased.

According to another embodiment of the invention, the wedge fault equalization and/or X-Y alignment take place when both the stamping side of the die and also the stamping side of the wafer are at least partially, preferably predominantly, covered by the fluid. It is especially advantageous if the fluid is transparent to electromagnetic rays, especially to light, so that during alignment, the position detection takes place through the fluid. This method is hereinafter called in-liquid alignment. This measure yields a depth of field region of the position detections means, especially optics for detecting the position of the position marks or of the stamping sides of the wafer and of the die. In this respect, the depth of field region is enlarged by the index of refraction of the fluid as multiplier.

As a consequence it is especially advantageous, when there are optical position detection means, especially optics, for wedge fault equalization and/or for X-Y alignment, during the wedge fault equalization and/or the X-Y alignment, that both the stamping side of the die or its alignment marks and also the stamping side of the wafer or its alignment marks be located, especially at the same time, in the depth of field region of the optical position detection means which are rigid especially to the wafer. Therefore according to the invention it is no longer necessary to shift the position detection means during position detection or during the alignment and the shaping. In this respect, the position detection means themselves do not have any effect on the position of the die relative to the wafer, and therefore an additional fault source is eliminated. In the prior art, the problem was that either a rigid position detection means with a larger depth of field region or a movable position detection means with a smaller depth of field region had to be used. This dilemma is resolved by this measure according to the invention.

The detection precision is improved or increased by the distance D, between the stamping side of the die and the stamping side of the wafer in the Z direction, being greater than 0 and at the same time smaller than the depth of field region in the Z-direction during the position detection.

A device according to the invention for producing a lens wafer which has a plurality of microlenses has the following features:
- a die with one stamping side with a stamping structure which has lens molds,
- a first receiving means for accommodating the die on one receiving side which faces away from the stamping side,
- a second receiving means for accommodating a wafer on its receiving side which faces away from its stamping side,
- application means for application of a curable fluid, especially a polymer, in fluid form to the stamping side or the stamping side,
- wedge fault equalization means and/or X-Y alignment means,
- stamping means for stamping of a lens wafer by shaping and curing of the curable fluid.

According to the present invention, a wafer can be aligned relative to the die during shaping, i.e., forming, by the wedge fault equalization means and/or the X-Y alignment means. In the past, alignment of the wafer relative to the die, i.e., wedge fault equalization or X-Y alignment, had not been possible during shaping of the lens wafer.

The device according to the invention is improved in that for wedge fault equalization and/or for X-Y alignment in the die, especially on the stamping side, there are alignment marks on at least one peripheral edge of the die which are arranged corresponding to alignment marks of the wafer.

For wedge fault equalization and/or for X-Y alignment, optical position detection means, especially optics, are provided. During the wedge fault equalization and/or the X-Y alignment, both the stamping side of the die or its alignment marks and also the stamping side or its alignment marks, can be arranged, especially at the same time, in the depth of field region of the optical position detection means which are rigid especially to the wafer.

In accordance with another aspect of the present invention, there is provided a lens wafer comprised of:
- a wafer with alignment marks which are designed for wedge fault equalization and/or for X-Y alignment in the wafer especially on the stamping side, preferably at least on one peripheral edge of the wafer and
- a microlens field which has been applied to the wafer, which has been aligned with the wafer by the wedge fault equalization and/or X-Y alignment, and which has been cured on the wafer.

Moreover, one or more microlenses which have been produced from the lens wafer by separation can be regarded as an independent invention.

A lens wafer which is produced by the device described as claimed in the invention and/or the method described as claimed in the invention can be regarded as an independent invention.

As another independent inventive idea it is conceivable to provide instead of the wafer, a second die for shaping of the curable fluid with which the curable fluid is shaped on its second side. The result would be a monolithic lens wafer which is formed exclusively from the curable fluid.

Other advantages, features and details of the invention will become apparent from the following description of preferred exemplary embodiments and using the drawings.

DETAILED DESCRIPTION OF PREFERRED EMBODIMENTS

In the figures the advantages and features of the invention are identified with reference numbers which identify them according to embodiments of the invention, components and features with the same or equivalent function being identified with identical reference numbers.

Figure 1:
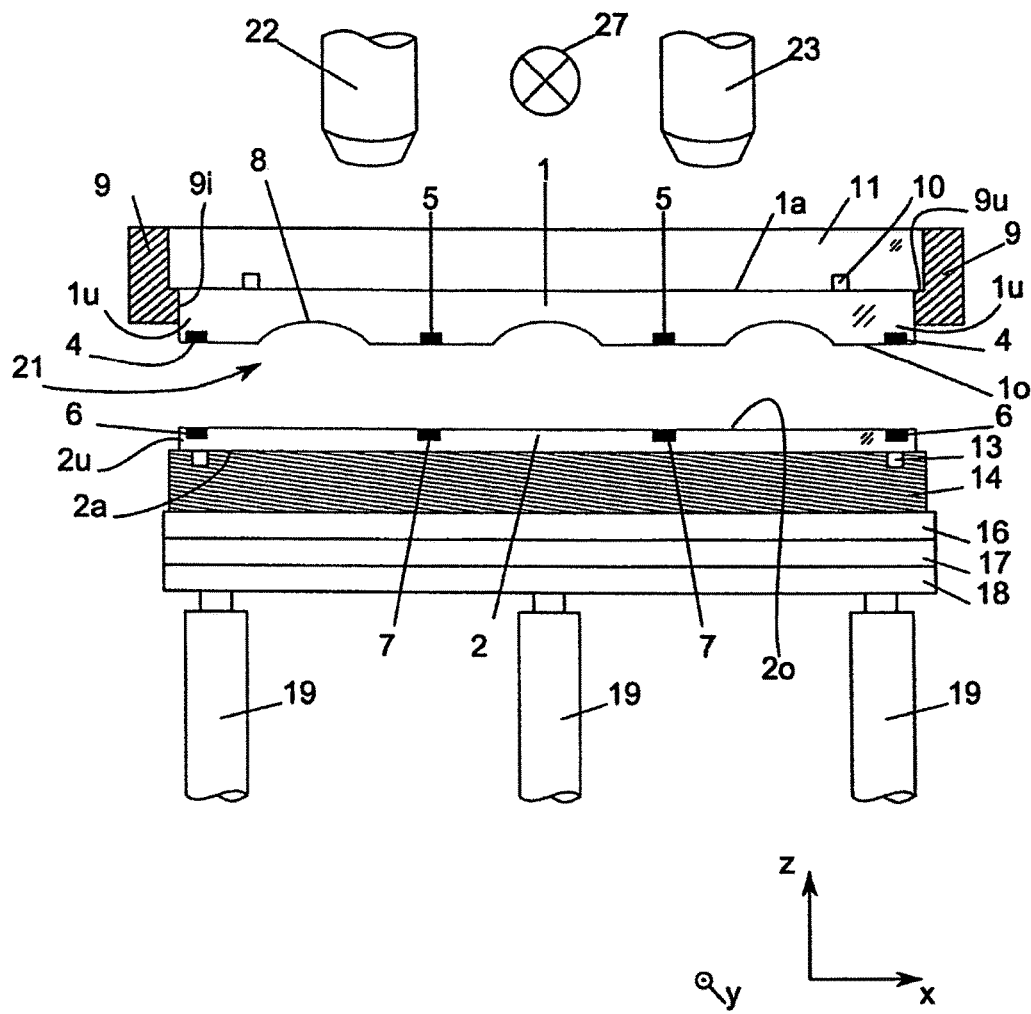
FIG. 1 shows a schematic cutaway side view of a device as claimed in the invention for producing a lens wafer which has a plurality of microlenses, FIGS. 2a to 2c schematically illustrate a method for producing a lens wafer according to one embodiment of the present invention, FIGS. 3a to 3c schematically illustrate a method for producing a lens wafer according to a second embodiment of the present invention, and FIGS. 4a to 4c schematically illustrate a method for producing a lens wafer, wherein a method according to FIGS. 2a to 2c, a modified die is used.
Figure 2A:
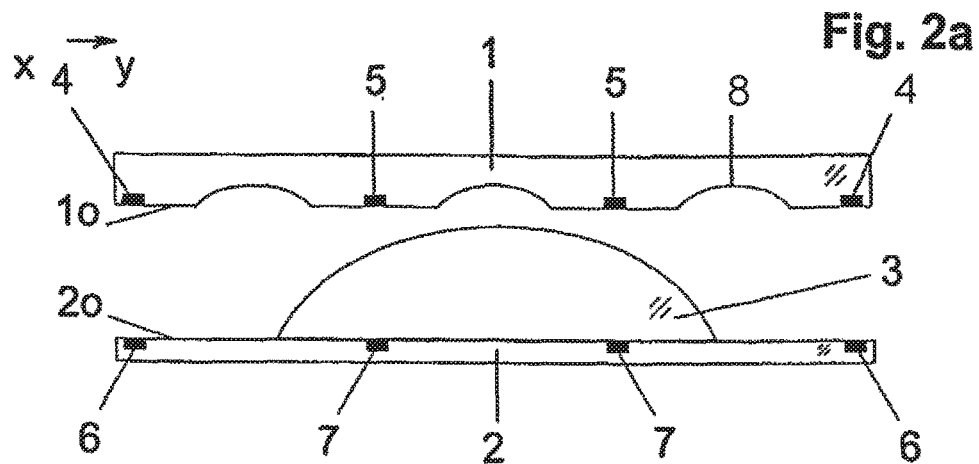
Figure 2B:
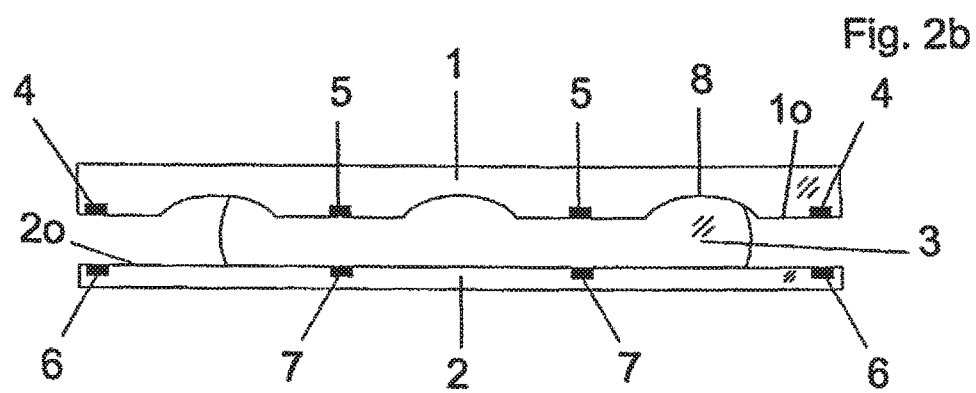
Figure 2C:
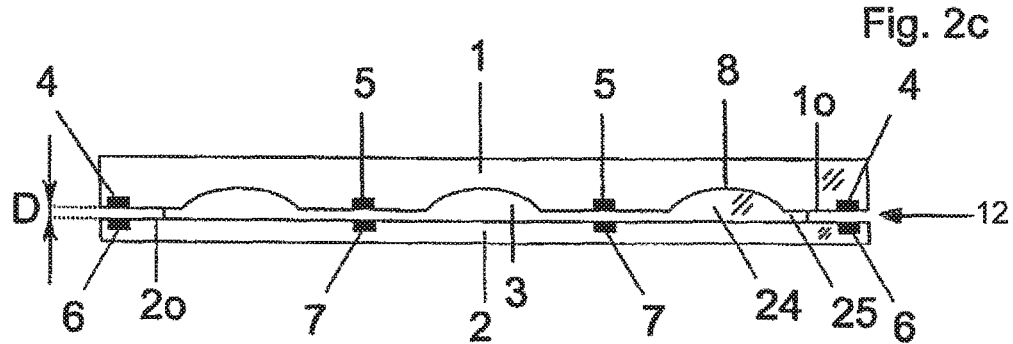
Figure 3A:
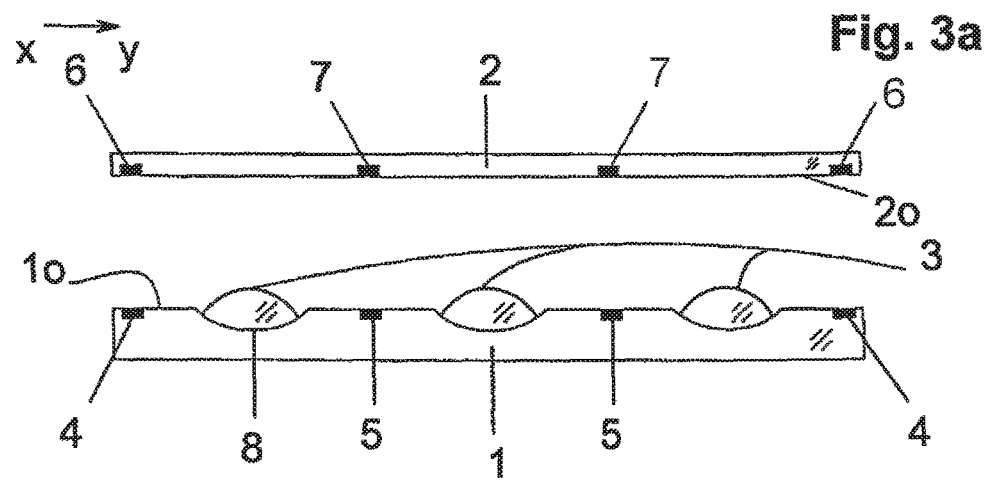
Figure 3B:
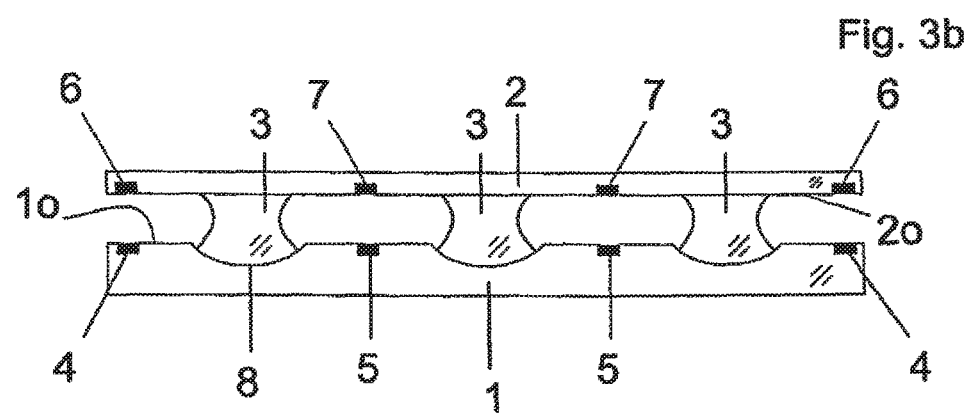
Figure 3C:
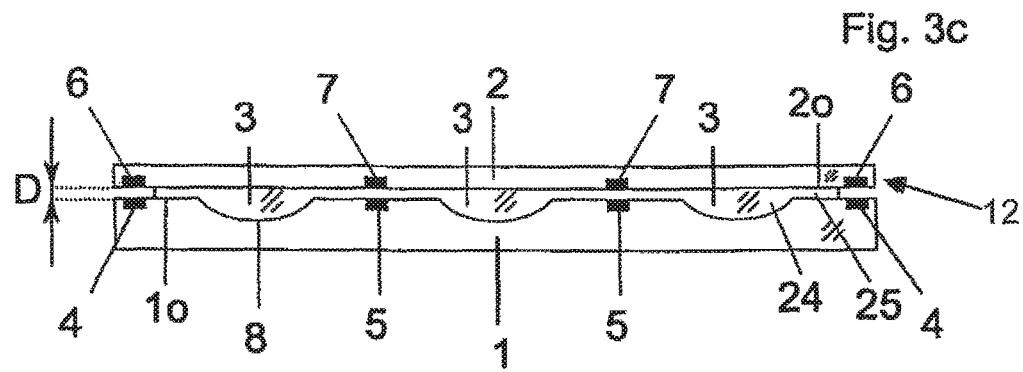
Figure 4A:
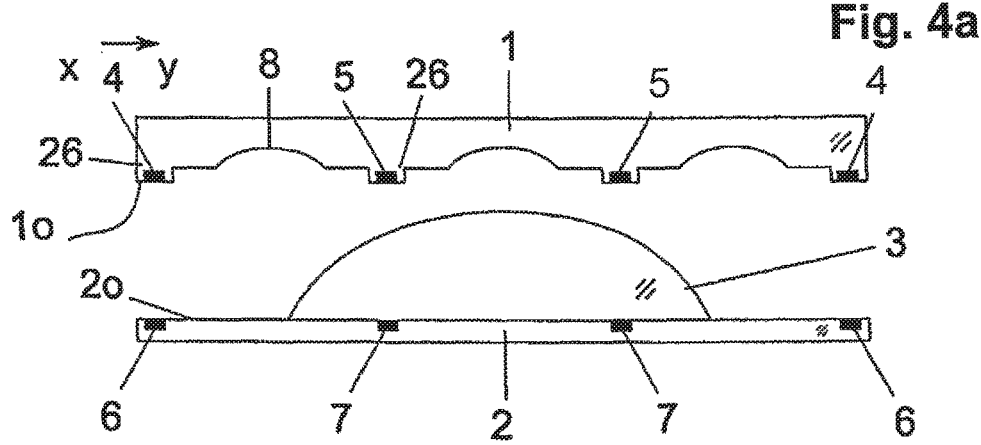
Figure 4B:
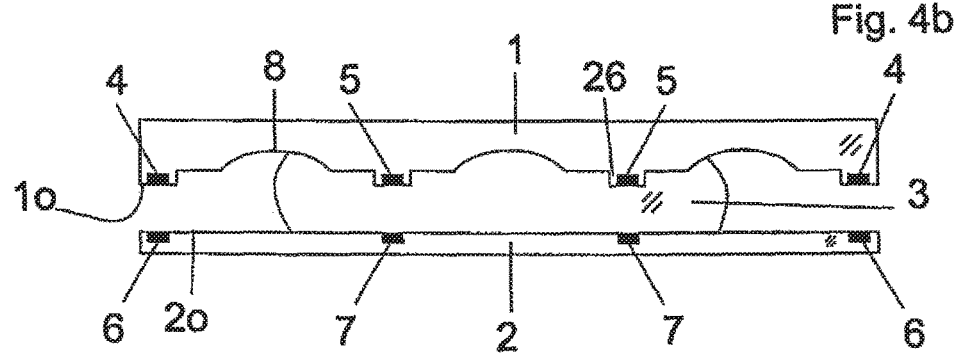
Figure 4C:
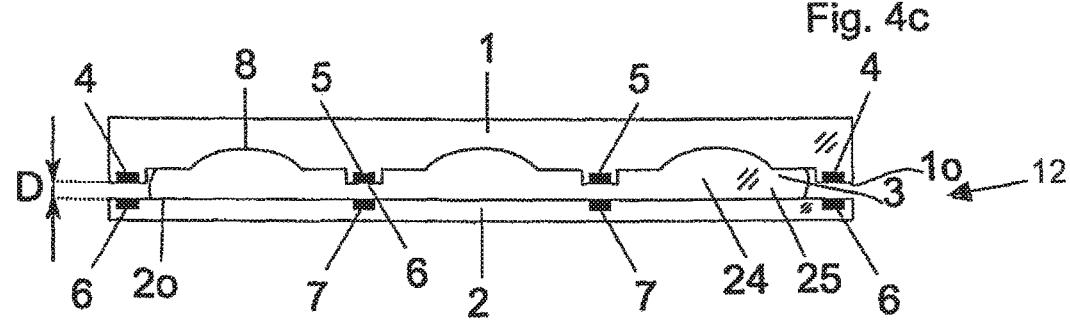

FIG. 1 shows a device according to the present invention for producing a lens matrix 25 which has a plurality of microlenses 24 (see FIGS. 2c, 3c and 4c).

In the embodiments shown, the lens matrix 25 is stamped onto an especially planar wafer 2. A die 1 with one stamping side 1o with a stamping structure 21 which has lens molds 8 is held in a first receiving means. The first receiving means is comprised of a holding device 9 which is ring-shaped on the interior thereof. The holding device 9 includes a peripheral shoulder 9u which extends toward the interior of the ring-shaped holding device. A receiver 11, which is provided with suction paths 10, is inserted and fixed in said holding device 9 on said peripheral shoulder 9. In turn, the die 1 has a receiving side 1a facing away from the stamping side 1o. Die 1 is fixed on the receiving side 1a on the receiver 11 via the suction paths 10. In addition, the die 1 is supported along its peripheral edge 1u by an inner ring wall 9i of the holding device 9.

The first receiving means is rigidly located in the device, on a rack which is not shown. Above the receiving means, optical position detection means are provided in the form of microscopes 22, 23 which are fixed or can be fixed relative to the receiving means or the die 1 at least in one Z-direction, which corresponds to one stamping direction. The Z-direction or stamping direction is orthogonal to an X-Y plane or to an X-direction and Y-direction which spans the X-Y plane. Exactly orthogonally to the Z-direction, and thus parallel to the stamping side 1o of the die 1, therefore to the X-Y plane, is a wafer 2 with its stamping side 2o opposite the stamping side 1o, at the instant of stamping of the lens matrix 25 onto the wafer 2. The lens matrix 25 and the wafer 2 jointly form a lens wafer 12.

The wafer 2 can be fixed on, i.e., attached to, a movable second receiving means. The movable receiving means is comprised of actuators 19 which are aligned to act in the Z-direction. Actuators 19 can be, for example, spindles. The actuators 19 can be each individually controlled by one control means. There are one X-drive 18 and one Y-drive 17 on the actuators 19. With the X-drive 18 a movement of the wafer 2 in the X-direction which is controlled by the control means is possible, while the Y-drive 17 can cause a movement of the wafer 2 in the Y-direction.

Furthermore, there is a rotation means 16 disposed between the actuators 19 and the wafer 2 with which a rotational movement, which rotates around an axis of rotation which runs in the Z-direction, can be executed by the control means.

Between the X-drive 18, the Y-drive 17 and the rotation means 16 and the wafer 2 a receiver 14 is fixed which in turn has suction paths 13. On the suction paths 13 the wafer 2 can be fixed on its receiving side 2a which is opposite the stamping side 2o.

The die 1 in the region of the peripheral edge 1u has outer alignment marks 4 which can be aligned with reference to outer corresponding alignment marks 6 of the wafer 2. The outer alignment marks 4, 6 are located especially laterally outside the area of the stamping structures 21 or the lens molds 8, preferably at no instant of the stamping process, especially of shaping, covered by a lens material which forms the lens matrix 25 in the form of a curable fluid 3. The outer alignment marks 4, 6 can be used for example for rough alignment of the die 1 relative to the wafer 2.

Furthermore, the die 1 has inner alignment marks 5 which can be aligned to corresponding inner alignment marks 7 of the wafer 2. The inner alignment marks 5, 7 are located outside or between the lens molds 8, especially translationally symmetrically on the die 1 or the wafer 2. During the stamping process or during shaping, the alignment marks 5, 7 are covered with the lens material or the curable fluid 3 at least towards the end of the stamping process or shaping.

The device has application means for applying the curable fluid 3, especially a polymer, in fluid form to the stamping side 1o and/or the stamping side 2o which are not shown. The application means can consist, for example, of a metering line which can be placed in the intermediate space between the die 1 and the wafer 2.

The individually controllable actuators 19 can execute wedge fault equalization by the relative position of the alignment marks 4, 5, 6, 7 to one another being detectable by the position detection means 22, 23 and by a possible wedge fault being corrected accordingly.

Likewise X-Y alignment takes place by the X-drive 18 and the Y-drive 17 as well as the rotation means 16.

The die 1 and the wafer 2 are moved together by the actuators 19 which can be moved in the Z-direction and the curable fluid is shaped during the movement together.

The stamping means furthermore comprise, in addition to the features provided for shaping, curing means for curing of the curable fluid 3 which are triggered by the control means as soon as the shaping of the lens wafer 12 is completed.

The position detection means 22, 23 are located on the side of the receiver 11 facing away from the stamping side 1o, and the position is detected through the receiver and die 1 which are transparent to electromagnetic radiation, especially visible or UV light. As claimed in the invention it is especially advantageous if position detection means with a depth of field less than 100 µm, especially less than 50 µm, preferably less than 25 µm, can be used.

The wafer 2 is generally transparent to corresponding electromagnetic radiation. The wafer 2 can be non-transparent when the final product is not transmission lenses, but only reflection lenses.

In the method step shown in FIG. 2a, curable fluid 3 is centrally applied to the wafer 2 by the above described application means (not shown).

Subsequently, according to FIG. 2b and by means of the actuators 19, the wafer 2 is moved onto the rigid die 1 and during the movement together the curable fluid 3 is shaped by the curable fluid 3 moving from the center of the wafer 2 in the direction of, i.e., toward, the peripheral edge 1u or peripheral edge 2u.

As soon as shaping according to FIG. 2c is completed, the movement in the Z-direction is stopped by the control means. The control quantity is, for example, a distance D between the stamping side 1o and the stamping side 2o.

Until the preset distance D is reached and within the depth of field region of the position detection means, during the movement together, i.e., during shaping of the curable fluid 3, wedge fault equalization can take place continually by the wedge fault equalization means and/or an X-Y alignment can take place by the X-Y alignment means so that when the preset distance D is reached the die 1 is aligned exactly, and without wedge faults, relative to the wafer 2. The corresponding alignment marks 4, 5, 6, and 7 at this instant all have exactly the same distance and since the alignment marks 4, 5, 6, 7 are each arranged flush on the stamping side 1o or 2o, the distance of the alignment marks 4, 5, 6, 7 corresponds to the preset distance D.

According to one preferred version, alignment takes place only within the depth of field, preferably during or after reaching the preset distance D.

The wedge fault equalization and the X-Y alignment take place preferably while the distance D is less than 100 µm, more preferably, less than 50 µm, and most preferably less than 25 µm.

In the embodiment of the method according to FIGS. 3a to 3c the device according to FIG. 1 is more or less reversed so that the wafer 2 is located above the die 1. In this embodiment, the die 1 is moved onto the wafer 2, while the wafer 2 remains rigid.

The position detection means are located underneath the die 1 in this case. The curable fluid 3 is applied into/onto the lens molds 8 by droplet deposition. In the case of concave lens molds 8, the curable fluid 3 is automatically held in a stable position by the force of gravity and the recess. In a convex lens mold the curable fluid has a relatively high viscosity in order to stabilize the polymer on the die or on the lens mold 8.

By moving the die 1 and the wafer 2 closer to one another the curable fluid 3 will come into contact with the stamping side 2o of the wafer 2. Depending on the amount of curable fluid 3, the distance of the lens molds 8 to one another and the ambient conditions, the inner alignment marks 5, 7 can be separated by the curable fluid 3, air and a gas, especially inert gas, preferably nitrogen or vacuum.

According to one version of the embodiment according to FIGS. 3a to 3c the die 1 is located above and the wafer 2 below, and the curable fluid 3 in this case can also be applied to the die 1 since as a result of the adhesion forces between the curable fluid 3 and the die the curable fluid 3 can adhere to the die 1.

According to another embodiment of the invention shown in FIGS. 4a to 4c, in contrast to the embodiment according to FIGS. 2a to 2c, the die 1 has projections 26. The projections 26 extend above the stamping side to and in the projections 26 there are alignment marks 4, 5 so that the alignment marks 4, 5 can be located nearer the corresponding alignment marks 6, 7 when the lens wafer 12 is being molded. The result is even more accurate alignment at a given thickness or height of the microlenses 24.

Otherwise the method according to FIGS. 4a to 4c corresponds to the method according to FIGS. 2a to 2c.

The curable fluid 3 is cured by irradiation means for producing electromagnetic radiation, especially in the form of at least one lamp 27, preferably a UV lamp, which means are located above or within the receiver 11.

Having described the invention, the following is claimed:

1. A method for producing a lens wafer having a plurality of microlenses, said lens wafer comprised of a lens material and a wafer, said method comprised of the following steps:
   rigidly fixing a first receiver in a receiver holding device;
   fixing a receiving side of a die in said first receiver, said receiving side of said die facing away from a stamping side of said die, the stamping side of the die having a stamping structure, the stamping structure having lens molds, said die being located opposite to the wafer;
   fixing a receiving side of the wafer in a second receiver, said receiving side of said wafer facing away from a stamping side of said wafer, said stamping side of said wafer being available to accommodate the lens material thereon;
   applying said lens material onto said stamping side of the wafer;
   stamping the lens wafer, comprising the steps of:
      shaping the lens material, comprising the steps of:
         individually controlling a plurality of actuators by respectively moving the second receiver and the wafer toward the die in a Z-direction in which the actuators are aligned to respectively act to shape the lens material accommodated on the stamping side of the wafer and equalize a wedge fault existing between the stamping sides during the shaping of the lens material to achieve parallel alignment of the stamping sides, the Z-direction running perpendicular to an X-Y plane and corresponding to a direction in which the wafer is to be stamped;
         during the individually controlling, adjusting an orientation of the second receiver relative to the first receiver for X-Y alignment of the wafer to the die in accordance with corresponding alignment marks in said die and said wafer, the adjusting comprising individually moving the second receiver in an X-direction using an X-drive and a Y-direction using a Y-drive to perform the X-Y alignment; and
         during the individually controlling and the adjusting, detecting with microscopes a relative position of the corresponding alignment marks of said die and said wafer to execute said X-Y alignment of said wafer to said die;
      and
   curing the shaped lens material,
   wherein the corresponding alignment marks are arranged at the same time in a depth of field region of the microscopes during the adjusting of the orientation.

2. The method as claimed in claim 1, wherein the individually controlling and/or the adjusting takes place continuously after a distance between the stamping sides is less than a predetermined distance D.

3. The method as claimed in claim 1 or 2, wherein the shaping takes place position-controlled.

4. The method as claimed in claim 1 or 2, wherein the corresponding alignment marks are provided on at least one peripheral edge of the stamping side of the die, and on at least one peripheral edge on the stamping side of the wafer.

5. The method as claimed in claim 1 or 2, wherein the individually controlling and/or the adjusting take place when both of the stamping sides are at least partially covered by the lens material.

6. The method as claimed in claim 1 or 2, wherein both the stamping side of the die and the stamping side of the wafer are located in the depth of field region of the microscopes during the individually controlling and/or the adjusting, and
   wherein the microscopes are fixed relative to the wafer.

7. The method as claimed in claim 6, wherein a distance D between the stamping sides in the Z direction is greater than 0 and smaller than the depth of field region of the microscopes in the Z-direction.

8. The method as claimed in claim 1, wherein the lens material is a polymer.

9. A method for producing a lens wafer having a plurality of microlenses, said lens wafer comprised of a lens material and a wafer, said method comprised of the following steps:
   rigidly fixing a first receiver in a receiver holding device:
   fixing a receiving side of said wafer in said first receiver, said receiving side of said wafer facing away from a stamping side of a die, the stamping side of the die having a stamping structure, the stamping structure having lens molds, said die being located opposite to the wafer, a stamping side of said wafer being available to accommodate the lens material thereon;
   fixing a receiving side of the die in a second receiver, said receiving side of said die facing away from said stamping side of said die;
   applying said lens material onto said stamping side of the wafer;
   stamping the lens wafer, comprising the steps of:
      shaping the lens material, comprising the steps of:
         individually controlling a plurality of actuators by respectively moving the second receiver and the die toward the wafer in a Z-direction in which the actuators are aligned to respectively act to shape the lens material accommodated on the stamping side of the wafer and equalize a wedge fault existing between the stamping sides during the shaping of the lens material to achieve parallel alignment of the stamping sides, the Z-direction running perpendicular to an X-Y plane and corresponding to a direction in which the wafer is to be stamped;

during the individually controlling, adjusting an orientation of the second receiver relative to the first receiver for X-Y alignment of the wafer to the die in accordance with corresponding alignment marks in said die and said wafer, the adjusting comprising individually moving the second receiver in an X-direction using an X-drive and a Y-direction using a Y-drive to perform the X-Y alignment; and during the individually controlling and the adjusting, detecting with microscopes a relative position of the corresponding alignment marks of said die and said wafer to execute said X-Y alignment of said wafer to said die; and curing the shaped lens material, wherein the corresponding alignment marks are arranged at the same time in a depth of field region of the microscopes during the adjusting of the orientation.

10. The method as claimed in claim 1, wherein the microscopes are fixed relative to the die.

11. The method as claimed in claim 1, wherein the detecting takes place through the lens material.

12. The method as claimed in claim 1, wherein the X-drive and the Y-drive are separately stacked on the actuators.

13. The method as claimed in claim 12, wherein the Y-drive is stacked between the X-drive and a rotation means, the rotation means being configured to rotate the wafer around an axis of rotation which runs in the Z-direction.

14. The method as claimed in claim 12, wherein the X-drive and the Y-drive are separately stacked between the actuators and the wafer.

15. The method as claimed in claim 12, wherein the X-drive is stacked between the Y-drive and the actuators.

* * * * *